United States Patent
Wunder et al.

(10) Patent No.: US 7,545,763 B2
(45) Date of Patent: Jun. 9, 2009

(54) METHOD FOR SENDING CHANNEL QUALITY INFORMATION IN A MULTI-CARRIER RADIO COMMUNICATION SYSTEM, CORRESPONDING MOBILE TERMINAL AND BASE STATION

(75) Inventors: Gerhard Wunder, Berlin (DE); Chan Zhou, Berlin (DE); Stephen Kaminski, Eislingen (DE); Hajo Bakker, Eberdingen (DE)

(73) Assignee: Alcatel Lucent, Paris (FR)

( * ) Notice: Subject to any disclaimer, the term of this patent is extended or adjusted under 35 U.S.C. 154(b) by 457 days.

(21) Appl. No.: 11/275,458

(22) Filed: Jan. 6, 2006

(65) Prior Publication Data

US 2006/0165188 A1    Jul. 27, 2006

(30) Foreign Application Priority Data

Jan. 27, 2005    (EP)    ................................ 05290177

(51) Int. Cl.
*H04B 7/204*    (2006.01)
(52) U.S. Cl. ........................ 370/319; 370/329; 370/344
(58) Field of Classification Search ................ 370/319, 370/329, 344, 210; 455/452.2, 69
See application file for complete search history.

(56) References Cited

U.S. PATENT DOCUMENTS

| 5,956,642 | A | | 9/1999 | Larsson et al. | |
|---|---|---|---|---|---|
| 6,088,327 | A | * | 7/2000 | Muschallik et al. | ......... 370/210 |
| 7,039,001 | B2 | * | 5/2006 | Krishnan et al. | ............ 370/203 |
| 7,388,847 | B2 | * | 6/2008 | Dubuc et al. | ................ 370/329 |
| 2004/0203477 | A1 | * | 10/2004 | Carballo et al. | ............... 455/69 |
| 2005/0058095 | A1 | * | 3/2005 | Sadri et al. | ................... 370/329 |

FOREIGN PATENT DOCUMENTS

WO    0231991 A2    4/2002

\* cited by examiner

*Primary Examiner*—David Q Nguyen
(74) *Attorney, Agent, or Firm*—Fay Sharpe LLP

(57) ABSTRACT

The present invention relates to a method for sending channel quality information in a multi-carrier radio communication system comprising at least one mobile terminal and at least one base station, said channel quality information being sent on a signaling channel by said mobile terminal to said base station.

According to the present invention, the method comprises the steps of:
  performing channel quality measurements on a plurality of frequency sub-carriers;
  generating and sending a first report over said signaling channel, said first report comprising a first channel quality information depending on said channel quality measurements on at least one sub-carrier, said at least one sub-carrier building an herein called first group of sub-carriers;
  determining a number of additional reports depending on the mobility grade of said mobile terminal;
  if said number of additional reports is not reached, generating and sending an additional report over said signaling channel comprising an additional channel quality information depending on channel quality measurements on at least one sub-carrier, said at least one sub-carrier building an herein called second group of sub-carriers, said second group of sub-carriers being different of said first group of sub-carriers.

11 Claims, 2 Drawing Sheets

METHOD FOR SENDING CHANNEL QUALITY INFORMATION IN A MULTI-CARRIER RADIO COMMUNICATION SYSTEM, CORRESPONDING MOBILE TERMINAL AND BASE STATION

BACKGROUND OF THE INVENTION

The invention is based on a priority application EP05290177.4 which is hereby incorporated by reference.

The present invention relates to a method for optimizing the use of the feedback channel in multi-carrier systems.

Such multi-carrier systems often implement Orthogonal Frequency Division Multiplexing (OFDM) as multi-carrier transmission technique. OFDM is for example used in the HIPERLAN/2 standard as well as an extension of the IEEE 802.11a standard for the 5 Ghz area. OFDM could also offer a sensible alternative for high-speed mobile applications, and thus represents an important step for next generation mobile radio systems or for a $4^{th}$ generation air interface. To this extend, the $3^{rd}$ Generation Partnership Project (3GPP), for the standardization of high-speed broadband wireless mobile communication systems, is recently considering the application of OFDM techniques for the high speed data packet access (HSDPA) air interface communication between the radio access network (RAN) and the user equipment (UE).

In multi-carrier systems as OFDM transmission system, the transmitted data is split into a number of parallel data streams, each one used to modulate a separate sub-carrier. In other words, the broadband radio channel is subdivided into a plurality of narrow-band subchannels or sub-carriers being independently modulated with e.g. QPSK, 16 QAM, 64 QAM or higher modulation order allowing higher data rate per sub-carrier.

In such OFDM systems, the sub-carrier frequencies can be allocated to a user channel on a short term basis (e.g. all 2 ms) as well the modulation order per sub-carrier defining a transmission channel for each user should be updated on the same short term basis.

A very important task of such multi carrier systems to provide for an efficient sub-carrier/modulation allocation to the different users. This is necessary to optimize and extend the performance of the multi-carrier system.

On the one hand, the selection of the best appropriate sub-carrier for each user should take into account that in mobile environment with multipath radio channels some sub-carriers may be subject to very strong channel attenuation when seen by a given user. Such sub-carriers would be useless allocated to this user because of fading. On the contrary they may be received with good quality by other users.

On the other hand, when the best appropriate sub-carriers are identified for a user, the optimal modulation to be used on these sub-carriers should be appropriately selected. The higher modulation orders can only be used if the signal to noise ratio (SNR) at the receiver is high enough to allow the demodulation.

All this optimization requires exchange of signaling/measure information in a feedback channel, so that the entity of the network which is responsible for resource allocation, respectively for modulation selection (e.g. the base station or Node B) disposes of quality measures performed at the different user equipments (UE).

In the ideal case, the UE should make a channel quality measurement for each sub-carrier and report it on the feedback channel to the Node B. The drawback is that this would represent a huge amount of signaling information (some Mbits) especially in multi carrier system with up to thousands of sub-carriers.

A particular object of the present invention is to provide a method for sending feedback information regarding the channel quality in a more efficient way so that the amount of feedback information is reduced but anyway sufficient for performing an efficient resource allocation in the multi carrier system.

Another object of the invention is to provide a corresponding mobile terminal and base station.

SUMMARY OF THE INVENTION

These objects, and others that appear below, are achieved by a method for sending channel quality information in a multi-carrier radio communication system according to claim 1, a mobile terminal according to claim 10, and a base station according to claim 11.

The method according to the present invention presents the advantage to reduce the signaling load on the feedback signaling channel while enabling it to refine the sub-carrier quality information when the mobility grade of the mobile terminal enables it. This results in an efficient resource allocation leading to an increased throughput in the network.

The method according to the present invention further presents the advantage to reduce the interference since the reduced load on the feedback signaling channel enables a transmission with a reduced transmitting power. For the same reason, the present invention presents the advantage to increase the battery life of user terminal reporting the channel quality information on the feedback signaling channel.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
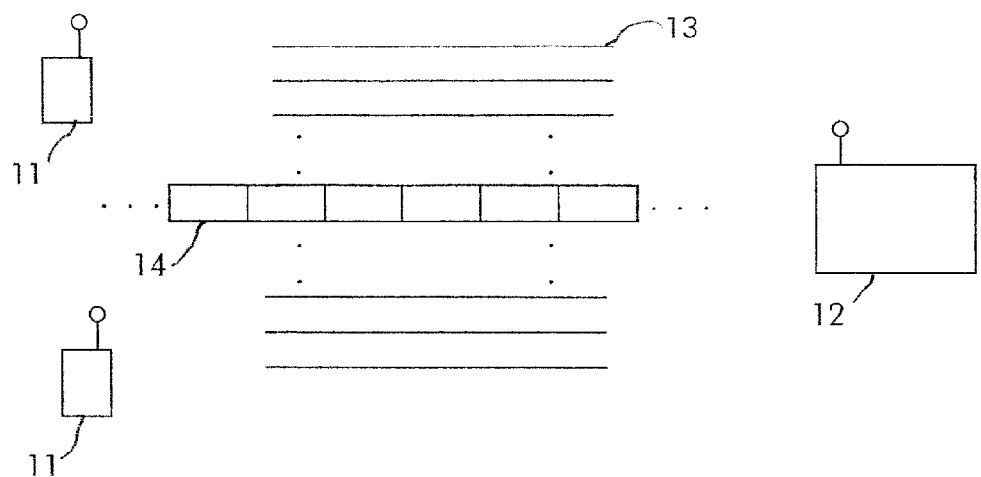
FIG. 1 shows an illustration of a network using multi-carrier transmission in the downlink and a feedback signaling channel according to the invention in the uplink.

FIG. 1 shows an illustration of a network using multi-carrier transmission in the downlink and a feedback signaling channel in the uplink. Mobile terminals 11 are receiving multi-carrier frequency signals in the downlink from base station 12 over a plurality of sub-carriers 13. On the uplink, mobile terminals 11 send signaling information to base station 12 on a feedback signaling channel 14.

The multi-carrier network may comprises 256, 512 or up to thousands of sub-carriers which are allocated to mobile terminals 11. Preferably, several sub-carriers 13 are allocated to each mobile terminal 11 in order to match the high throughput received from base station 12 in the downlink. The frequency separation between the sub-carriers is chosen so that the sub-carriers are orthogonal to one another (i.e. the data transmitted on one sub-carrier is not causing interference on the data sent on the other sub-carriers).

According to the present invention, mobile terminals are performing channel quality measurements on the different sub-carriers. These channel quality measurements may consist in the measurement of carrier to noise ratio or bit error rates performed using prior art methods well known for the persons skilled in the art. These measurements are stored at mobile terminals 11 and performed at regular time interval so that the modification of the channel behavior can be easily tracked.

According to the present invention, the mobile terminals 11 are generating reports comprising a indication of the channel quality for groups of sub-carriers. The term group should be understood as containing one or more sub-carriers.

Preferably, the sub-carriers are grouped the following way: A predefined number N of consecutive sub-carriers form a group, the next N consecutive sub-carriers form the next group and so on. It will be clear for a person skilled in the art that the predefined number of sub-carriers forming a group should result from a trade off between signaling load reduction and loss of accuracy. Moreover, other groupings mechanisms may be envisaged, provided that both mobile terminals 11 and bases station 12 are able to determine this grouping mechanisms. Such mechanisms may group non consecutive sub-carriers together or make groups containing not the same number of sub-carriers. The grouping is preferably defined at system initialization and dependent on the mobility grade of the mobile terminal (i.e. different grouping strategy should be applied depending on the velocity of the mobile terminal).

The channel quality information sent in the report for a group of sub-carriers may be an averaged value of the channel quality values measured on the sub-carriers 13 belonging to the group of sub-carriers. Alternatively, the channel quality information may indicate the number and position of the sub-carriers having a channel quality measurement above a predefined quality threshold.

This enables it to reduce the signaling load on feedback signaling channel 14 since not one report per sub-carrier is sent but one report per group of sub-carriers.

At the same time, there is an accuracy loss in this report since it is no more possible to distinguish between sub-carriers received with good quality and sub-carriers received with bad quality inside a single group report.

According to the present invention, this disadvantage is mitigated by the fact that additional reports refine the channel quality information sent in the first report. Indeed, additional reports comprise a channel quality information for subgroups of sub-carriers belonging to the original group of sub-carriers. According to the present invention, the grade of refinement which can be obtained for a group of sub-carriers is dependent on the mobility grade of the mobile terminal 11.

If the mobility grade of the mobile terminal corresponds to a mobile terminal velocity higher than a predefined threshold, the report of the group is preferably not refined because the channel quality is evolving too rapidly to be able to rely on further refinement of the original report. In this case, the report preferably comprises a CQI parameter as defined in HSDPA (High Speed Downlink Packet Access) standards 3GPP 25.214, 3GPP 25.211. Alternatively, the report can comprise the averaged value of the channel quality measurements for all sub-carriers.

On the contrary, if the mobility grade of the mobile terminal correspond to a velocity lower than the predefined threshold at least one additional report can be sent from the mobile terminal 11 to the base station 12 giving information on the channel quality of a sub-group of the original group of sub-carriers.

In a preferred embodiment of the present invention, the reports are performed the following way.

A field in the report indicates the mobility grade of the mobile terminal. This mobility grade may take four values, very high, high, medium, low. It will be understood by those skilled in the art that additional mobility grade may be defined. The number of parameters defining the number of mobility grades defining the size of the corresponding field in the report.

A predefined maximum number of reports is associated to each mobility grade. Indeed, due to the mobility of the mobile terminal 11, the channel quality information of a group of sub-carriers must be updated in a certain period of time dependent on the coherence time of the channel. Hence, if a channel quality information is outdated, the channel quality information should be reported again, limiting the maximum refinement. As a consequence, the lower the mobility grade the higher the maximum number of reports related to a group of sub-carriers.

The method according to the present invention enables it on the one hand to perform a very accurate channel description for slowly moving mobile terminals resulting thus in a high exploitation of channel capacity and on the other hand to perform a very sketchy channel description for the fast moving mobile terminals to guaranty a certain transmit rate.

Base station 12 should be able to deduce from the field "mobility grade" how many additional report reports will follow according to the refinement strategy related to the mobility grade A refinement strategy may consist in first giving a rough indication on the sub-carriers with an acceptable channel quality, then focusing on the good and eventually on the best ones. In such a strategy, threshold T0 is lower than threshold T1 which is lower than threshold T2 implemented as follows:

The first reports indicates the set S0 of sub-carriers for which the channel quality information is higher than predefined threshold T0. If a second report is possible according to the mobility grade of the mobile terminal, the second report indicates the set S1 of sub-carriers belonging to S0 for which the channel quality information is higher than predefined threshold T1. If a third report is possible according to the mobility grade of the mobile terminal, the third report indicates the set S2 of sub-carriers belonging to S1 for which the channel quality information is higher than predefined threshold T2 and so on . . . An example for this refinement strategy will be further detailed in FIG. 3.

Another refinement strategy could consist on the contrary in first reporting the sub-carriers with the best channel quality and then reporting the one with good channel quality and eventually the ones with only acceptable channel quality. In this case threshold T0 is higher than threshold T1 which is higher than threshold T2. In this case the set S0, S1 and S2 as defined above are not overlapping.

Another refinement strategy could consist in subdividing each group of sub-carriers in a predefined number of subgroups (preferably 2) and sending a report for each subgroup, this report indicating for example the averaged channel quality measurements for the sub-carriers in each subgroup. This refinement strategy presents the advantage not to privilege the first sub-carriers of the group as the previously described method would do but evenly report the channel quality of all sub-carriers in the group. On the other hand, this second method presents the disadvantage to need more time to localize sub-groups with good channel quality.

The feedback channel 14 may be advantageously implemented according to HSDPA (High Speed Downlink Pack Access) specification where the frequency selective channel quality information according to the invention are sent back from the mobile terminals 11 to the base station 12 over a HS-DPCCH (High speed dedicated Physical Control Channel) having a capacity of around 1500 bit/s.

Figure 2:
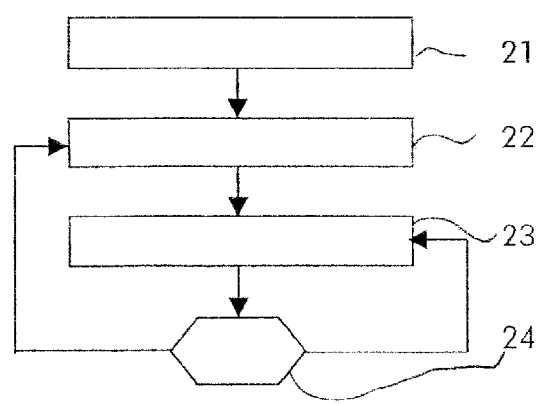
FIG. 2 shows an implementation of the method for sending channel quality information in a multi-carrier radio communication system according to the present invention.

FIG. 2 shows an implementation of the method for sending channel quality information in a multi-carrier radio communication system according to the present invention. The following steps are performed at the mobile terminals 11.

Step 21 consists in performing channel quality measurements on a plurality of frequency sub-carriers;

Step 22 consists in generating and sending a first report over the signaling channel, the first report comprising a first channel quality information f depending on said channel quality measurements on a first group of sub-carriers;

Step 23 consists in applying a refinement strategy for generating an additional report depending on the mobility grade of the mobile terminal. The mobility grade preferably determine the number of thresholds which will be used in the refinement strategy (e.g. 4 threshold for mobility grade "high"), moreover the mobility grade determine the value of the used thresholds, the number of sub-carrier per sub-groups and the grouping mechanisms, as well the mobility grade preferably define the maximum number of reports per loops. The maximum number of reports may not be reached if, for example, the mobility grade of the mobile terminal is modified and a new refinement strategy should be used for reporting;

Step 24 consists in determining if the mobility grade of the mobile terminal has changed or if the maximal number of reports per loop has been reached. If it is the case, step 22 is executed. If it is not the case, step 23 is executed.

Figure 3:
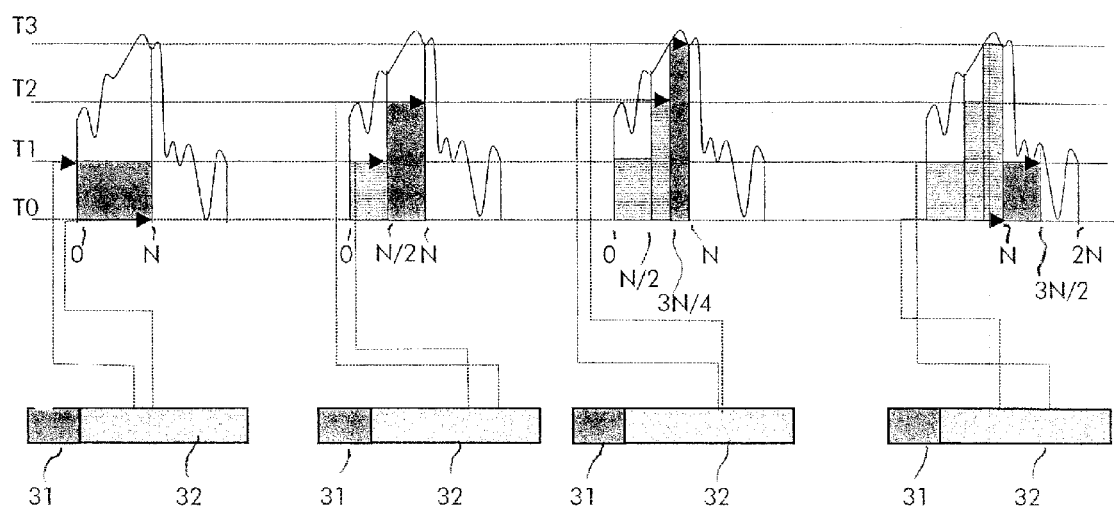
FIG. 3 shows an example of the reports sent on the feedback signaling channel according to the present invention.

FIG. 3 shows an example of reports sent on the feedback signaling channel according to the present invention. The curves represents the measured channel quality on the plurality of sub-carriers. The quantity represented on the x-axis is the number of the sub-carriers. The quantity represented on the y-axis is the measured channel quality preferably a carrier to interference ratio or a bit error rate. Four quality thresholds T0, . . . , T3 are represented on the graphic. In this example the sub-carriers are grouped in groups of N sub-carriers. The total frequency band correspond to 2N sub-carriers.

The field 31 of the first report comprises the mobility grade for example "high". This field is used by the base station to determine which refinement strategy is used by the mobile terminal for reporting on the feedback channel.

The field 32 of the first reports indicates that the channel quality for sub-carriers between 0 and N is higher than threshold T1 and that the channel quality for sub-carriers between N and 2N is higher than threshold T0.

The refinement strategy used in this example consists in further subdividing in 2 sub-groups the group of sub-carrier showing the best channel quality. Consequently, the second report indicates that the channel quality for sub-carriers between 0 and N/2 is higher than threshold T1 and that the channel quality for sub-carriers between N/2 and N is higher than threshold T2.

The third report indicates that the channel quality for sub-carriers between N/2 and 3N/4 is higher than threshold T1 and that the channel quality for sub-carriers between 3n/4 and N is higher than threshold T2

Since all three reports concerning the group of sub-carriers between 0 and N have been sent, the next report is related to the next group of sub-carriers from N to 2N. The fourth report indicates that the channel quality for sub-carriers between N and 3N/2 is higher than threshold T1 and that the channel quality for sub-carriers between 3N/2 and 2N is higher than threshold T0. Depending on the field 32 in the fourth report, the next reports are either related to a refinement of the channel quality information in the group between N and 2N or to a channel quality information for the group of sub-carriers between 0 and 2N. Indeed, when the mobility grade is modified, another refinement strategy is used by the UE and the reports should be reinitialized.

In this example, each reprot consists in 6 bits. The first 2 bits (field 31) for the mobility grade, the next two bits (first half of field 32) for the threshold value of the first sub-group and the last 2 bits (second half) of field 32) for the threshold value of the last sub-group.

It will be clear for the persons skilled in the art, that the method according to the present invention may be applied to cases having more than 4 mobility grades, more than 4 threshold values and more than 2 groups resp sub-groups per report.

Possible values may be given by the table below

| Mobility grade | Number of thresholds | Thresholds values | Number of groups per reports | Max. number reports of per loop |
|---|---|---|---|---|
| low | 10 | T0 = −15 dBm ΔT = 3 dB | 20 | 200 |
| medium | 7 | T0 = −10 dBm ΔT = 4 dB | 10 | 70 |
| high | 4 | T0 = −10 dBm ΔT = 9 dB | 10 | 40 |
| Very high | 10 | T0 = −15 dBm ΔT = 3 dB | 1 | 1 |

These parameters may be defined at system initialization and communicated to the UE and the basis station. In a preferred embodiment of the present invention, these parameters may be updated at regular time intervals by the base station or by any entity of the network and communicated to the UE.

It will also be understood by those skilled in the art that field 32 of the reports may contain channel quality information related to groups or sub-groups of sub-carriers formulated in other ways. For example, the filed 32 may contain the the groups/sub-groups having a channel quality higher than a threshold T1, then the groups/sub-groups having a channel quality higher than T2 and so on.

The method according to the present invention may be used for different purposes. First of all, this method can help optimizing the allocation of sub-carriers to the different mobile terminals in a way which improve the capacity in the downlink. Only sub-carriers presenting a good channel quality towards a mobile station being allocated to this mobile terminal.

Secondly, this method may be of first importance in dynamic resource allocation since the channel quality of the different sub-carriers is actualized almost on real time basis so that the current channel conditions depending on the mobile terminal velocity can be taken into account to enables it to allocate the best appropriate sub-carriers to the mobile terminals.

To summarize the method according to the present invention enables it to enhance the performance of OFDM downlink system by frequency selective resource allocation algorithm such as adaptive modulation, sub-carrier allocation or power control. According to the channel conditions reported from the mobile terminal to the base station, the resource can be optimally distributed to achieve maximal throughput.

The invention claimed is:

1. Method for sending channel quality information in a multi-carrier radio communication system having a plurality of orthogonal frequency sub-carriers, said multi-carrier radio communication system comprising at least one mobile terminal and at least one base station, said channel quality information being sent on a signaling channel by said mobile terminal to said base station, said method comprising the steps of:
performing channel quality measurements on a plurality of frequency sub- carriers;
generating and sending a first report over said signaling channel, said first report comprising a first channel quality information depending on said channel quality measurements on at least one sub-carrier, said at least one sub-carrier building an herein called first group of sub-carriers;
determining a number of additional reports depending on a mobility grade of said mobile terminal;
if said number of additional reports is not reached, generating and sending an additional report over said signaling channel comprising an additional channel quality information depending on channel quality measurements on at least one sub-carrier, said at least one sub-carrier building an herein called second group of sub-carriers, said second group of sub-carriers being different of said first group of sub-carriers.

2. Method according to claim 1, wherein said first group of sub-carriers comprises at least two sub-carriers, said second group of sub-carriers being a subset of said first group of sub-carriers.

3. Method according to claim 1, wherein said first group of sub-carriers and said second group of sub-carriers are not overlapping.

4. Method according to claim 1, wherein said first group of sub-carriers identifies sub-carriers whose channel quality measurements are above a predefined first threshold and second group of sub-carriers identifies sub-carriers whose channel quality measurements are above an additional predefined threshold.

5. Method according to claim 1, wherein said mobility grade is univocally associated to a number of predefined thresholds, threshold values, and the maximal number of reports per loop.

6. Method according to claim 1, wherein said mobility grade is associated with a subdivision of the plurality of sub-carriers defining a predefined number of sets, said first channel quality information indicating for which sets all the contained sub-carriers have channel quality measurements higher than a first threshold, said additional channel quality information indicating for which sets all the contained sub-carriers have channel quality measurements higher than a second threshold.

7. Method according to claim 5, wherein the association is established at system initialization and can be updated at regular time intervals by the base station or another network entity, said association being communicated to the mobile terminal and to the base station.

8. Method according to claim 1, wherein each report comprises additionally said mobility grade.

9. Method according to claim 1, wherein if said mobility grade corresponds to a velocity higher than a predefined threshold only one report is made.

10. Mobile terminal adapted to be used in a multi-carrier radio communication system having a plurality of orthogonal frequency sub-carriers, said mobile terminal comprising means for performing channel quality measurements on a plurality of frequency sub-carriers and means for sending channel quality information on a signaling channel to a base station, said mobile terminal being characterized in that it further comprises:
means for performing channel quality measurements on a plurality of frequency sub-carriers;
means for generating and sending a first report over said signaling channel, said first report comprising a first channel quality information depending on said channel quality measurements on at least one sub-carrier, said at least one sub-carrier building an herein called first group of sub-carriers;
means for determining a number of additional reports depending on the mobility grade of said mobile terminal;
if said number of additional reports is not reached, means for generating and sending an additional report over said signaling channel comprising an additional channel quality information depending on channel quality measurements on at least one sub-carrier, said at least one sub-carrier building an herein called second group of sub-carriers, said second group of sub-carriers being different of said first group of sub-carriers.

11. A multi-carrier radio communication system having a plurality of orthogonal frequency sub-carriers, said system comprising at least one mobile terminal and at least one base station, said mobile terminal comprising means for performing channel quality measurements on a plurality of frequency sub-carriers and means for sending channel quality information on a signaling channel to said base station, and said base station comprising means for receiving said channel quality information on said signaling channel,
said mobile terminal further comprising:
means for performing channel quality measurements on a plurality of frequency sub-carriers;
means for generating and sending a first report over said signaling channel, said first report comprising a first channel quality information depending on said channel quality measurements on at least one sub-carrier, said at least one sub-carrier building an herein called first group of sub-carriers;
means for determining a number of additional reports depending on the mobility grade of said mobile terminal; and
if said number of additional reports is not reached, means for generating and sending an additional report over said signaling channel comprising an additional channel quality information depending on channel quality measurements on at least one subcarrier, said at least one sub-carrier building an herein called second group of sub- carriers, said second group of sub-carriers being different of said first group of sub- carriers;
and said base station further comprising:
means for receiving said first report over said signaling channel;
means for determining said number of additional reports depending on said mobility grade of said mobile terminal; and
if said number of additional reports is not reached, means for receiving said additional report over said signaling channel.

* * * * *